US008320255B2

(12) United States Patent
Vasseur et al.

(10) Patent No.: US 8,320,255 B2
(45) Date of Patent: Nov. 27, 2012

(54) INTER-DOMAIN PATH COMPUTATION TECHNIQUE

(75) Inventors: Jean-Philippe Vasseur, Dunstable, MA (US); Muthurajah Sivabalan, Kanata (CA); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 681 days.

(21) Appl. No.: 11/049,587

(22) Filed: Feb. 2, 2005

(65) Prior Publication Data

US 2006/0171320 A1    Aug. 3, 2006

(51) Int. Cl.
    *G01R 31/08*    (2006.01)
(52) U.S. Cl. ........ 370/238; 370/252; 370/254; 370/352; 370/392; 370/396; 370/398; 370/395.5; 370/401
(58) Field of Classification Search .................. 370/351, 370/352, 252, 254, 401
    See application file for complete search history.

(56) References Cited

U.S. PATENT DOCUMENTS

| | | | |
|---|---|---|---|
| 6,256,309 B1 | 7/2001 | Daley et al. ................... | 370/255 |
| 6,370,119 B1 | 4/2002 | Basso et al. ................... | 370/252 |
| 6,553,423 B1 | 4/2003 | Chen .............................. | 370/229 |
| 6,600,724 B1 | 7/2003 | Cheng ........................... | 370/395 |
| 6,728,777 B1 | 4/2004 | Lee et al. | |
| 6,765,880 B1 | 7/2004 | Hillard et al. ................ | 370/258 |
| 6,778,531 B1 | 8/2004 | Kodialam et al. | |
| 6,993,593 B2 * | 1/2006 | Iwata ............................ | 709/238 |
| 7,120,120 B2 * | 10/2006 | Guerin et al. ................. | 370/238 |
| 2003/0072270 A1 * | 4/2003 | Guerin et al. ................. | 370/254 |
| 2003/0099203 A1 * | 5/2003 | Rajan et al. ................... | 370/238 |
| 2003/0103449 A1 | 6/2003 | Barsheshet et al. | |

FOREIGN PATENT DOCUMENTS

WO    WO-03/049342 A2    6/2003

OTHER PUBLICATIONS

Inter-Area Routing, Path Selection and Traffic Engineering, Version 1: Nov. 2003 Ben Wright Customer Services Consultant, Data Connection Ben.Wright@dataconnection.com.*
Guidelines for Interdomain Traffic Engineering, Jennifer Rexford Internet and Networking Systems AT&T Labs—Research Florham Park, NJ 07932 jrex@research.att.com Jay Borkenhagen AT&T IP Services AT&T Labs Middletown, NJ 07748 jayb@att.com.*

(Continued)

*Primary Examiner* — Nishant B Divecha
(74) *Attorney, Agent, or Firm* — Cesari and McKenna, LLP

(57) ABSTRACT

A technique computes a traffic engineering (TE) label switched path (LSP) that spans multiple domains of a computer network from a head-end node of a local domain to a tail-end node of a remote domain. The novel inter-domain TE-LSP computation technique comprises a computation algorithm executed by the head-end node, which utilizes Path Computation Elements (PCEs) located within the remote domains (i.e., other than the local domain). Specifically, the head-end node requests path segments from a PCE in each of the remote domains, in which the path segments represent paths between all entry border routers to either all exit border routers of the particular remote domain (i.e., through the domain), or to the tail-end node. Upon receiving path segments from each remote domain, the head-end node combines the path segments with local domain information, and performs a forward path computation from the head-end node to the tail-end node to find the best (i.e., "shortest") path.

19 Claims, 6 Drawing Sheets

OTHER PUBLICATIONS

Multi Protocol Label Switching Label Distribution Protocol Query Message Description Network Working Group Internet Draft P. Ashwood-Smith A. Paraschiv D. Allan Nortel Networks Jun. 2003.*

RSVP-TE: Extensions to RSVP for LSP Tunnels Network Working Group Internet Draft Daniel O. Awduche Movaz Networks, Inc.*

Applicability Statement for Extensions to RSVP for LSP-Tunnels Internet Engineering Task Force Internet-Draft MPLS Working Group Daniel O. Awduche Movaz Networks Alan Hannan Routingloop XiPeng Xiao Photuris Apr. 2001.*

Requirements for Traffic Engineering Over MPLS Internet Engineering Task Force Internet-Draft MPLS Working Group Daniel O. Awduche Joe Malcolm Johnson Agogbua Mike O'Dell Jim McManus UUNET (MCI Worldcom) Jun. 1999.*

Inter-AS MPLS Traffic Engineering IETF Internet Draft Jean-Philippe Vasseur (Editor) Cisco Systems, Inc. Raymond Zhang Infonet Services Corporation Jun. 2003.*

RFC 3906, Calculating Interior Gateway Protocol (IGP) Routes Over Traffic Engineering Tunnels, Shen et al, 10, 2004.*

Rekhter, Y., RFC 1771, entitled A Border Gateway Protocol 4 (BGP-4), Mar. 1995, pp. 1-54.

U.S. Appl. No. 10/767,574, filed Sep. 18, 2003, Vasseur et al., entitled Computing Inter-Autonomous System MPLS Traffic Engineering LSP Paths.

U.S. Appl. No. 10/982,641, filed Nov. 5, 2004, Vasseur et al., entitled System and Method for Retrieving Computed Paths from a Path Computation Element Using a Path Key.

U.S. Appl. No. 10/983,327, filed Nov. 5, 2004, Vasseur et al., entitled System and Method for Retrieving Computed Paths from a Path Computation Element Using Encrypted Objects.

Vasseur, J. P. et al., OSPF Work Working Group Internet Draft, entitled OSPF MPLS Traffic Engineering Capabilities (draft-vasseur-ospf-te-caps-00.txt), Jul. 2004, pp. 1-14.

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-28.

Braden, R. at al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999, Section 12.2.4, pp. 317-319.

PCT Notification of Transmittal of the International Search Report and the Written Opinion of the International Searching Authority, or the Declaration, International Application No. PCT/US06/03237, International Filing Date: Jan. 30, 2006, Date of Mailing Sep. 3, 2006, 12 pages.

Supplementary European Search Report, European Application No. 06719884.6-2416 / 1844563, PCT/US2006/003237, Applicant: Cisco Technology, Inc., Date of Mailing: Oct. 5, 2010, pp. 1-7.

Vasseur, Jean-Philippe, et al., "A Framework for Inter-Domain MPLS Traffic Engineering," Adrian Farrel Olddog Consulting, draft-ietf-ccamp-inter-domain-framework-00.txt, IETF Standard-Working- Draft, Internet Engineering Task Force, IETF, CH, vol. ccamp, Aug. 2004, pp. 1-32.

Dachille, A., et al., "Diverse Inter-Region Path Setup/Establishment," CCAMP Working Group, draft-dachille-diverse-inter-region-path-setup-01.txt, IETF Standard-Working- Draft, Internet Engineering Task Force, IETF, CH, No. 1, Oct. 2004, pp. 1-28.

* cited by examiner

INTER-DOMAIN PATH COMPUTATION TECHNIQUE

BACKGROUND OF THE INVENTION

1. Field of the Invention

The present invention relates to computer networks and more particularly to computing inter-domain paths utilizing path computation elements of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas". It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or an area is generally referred to as a "domain", and a router that interconnects different domains together is generally referred to as a "border router".

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Various path computation methodologies are available including CSPF (constrained shortest path first).

One example algorithm that may be used to compute the shortest path from a source to a destination is the well-known Dijkstra path computation algorithm. Briefly, the Dijkstra algorithm, as applied herein, computes the shortest path from a source node to any destination node, thereby creating a shortest path tree (SPT). To reach a destination node on the shortest path, a source node simply traverses the SPT to the destination node. The calculations are based on cost metrics between the nodes, and are performed outwardly from the source node. For this reason, the Dijkstra algorithm is considered a "forward path computation". The Dijkstra algorithm is described in more detail in Section 12.2.4 of the text book *Interconnections Second Edition*, by Radia Perlman, published September 1999, which is hereby incorporated by reference as though fully set forth herein.

Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Notably, MPLS TE- LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other requests from other PCCs. It is important to note that when one PCE sends a request to another PCE, it acts as a PCC. PCEs conventionally have limited or no visibility outside of its surrounding area or AS. A PCC can be informed of a PCE either by pre-configuration by an administrator, or by a PCE Discovery (PCED) message ("advertisement"), which is sent from the PCE within its area or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas or levels. Neither the head-end LSR nor any single PCE will have sufficient knowledge to compute a path. Because of this, MPLS Traffic Engineering path computation techniques are required to compute inter-domain TE-LSPs.

A first example approach to compute inter-domain paths is a "per-domain" path computation, which relies on an entry node of each domain to compute a path to a next exit node of its domain. Entry and exit nodes of a domain (or "border nodes") may be specified by the head-end node as "loose hops" (i.e., a notation signifying the desired entry and exit of the domain, without specifying the physical path through the domain). Alternatively, upon receiving a request to compute a path through its domain, an entry node of each domain computes the preferred exit node of the same domain. Although the "per-domain" approach is simple, it does not guarantee the computation of an optimal (shortest) inter-domain path because it is serialized, and does not account for the costs of the next domain when computing paths of the current domain. Also, this approach does not provide for a mechanism to guarantee a set of diversely routed paths because the entry try nodes in each domain perform their path computation for the required segment independently of each other.

In another example approach, the use of PCEs has been adapted to create a distributed PCE architecture, in order to extend MPLS TE-LSPs across domain boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

VSPTs, which may be represented as virtual links made of "loose hops", are used because service providers may desire to maintain their internal network architectures and designs confidential. One way to compute the VSPTs is by using a virtual shortest path tree (VSPT) algorithm. Generally, a VSPT is a compressed path description (entry and exit/destination points of domains) that informs a previous PCE that a destination can be reached from a particular entry to a particular exit in such a way that the internal path specifics are kept confidential from an adjacent domain. The virtual links that compose the VSPT will generally have an associated network cost for each calculated link. It should be noted that in the context of multiple domains operating under a common authority (e.g. a unique service provider), such virtual links may also specify an entire path. A set of virtual links may be further organized (in certain protocols) within an explicit route object (ERO) to facilitate transfer of the compressed path descriptions to the previous PCE.

Specifically, according to the VSPT algorithm, for an inter-domain path computation example, a PCC (e.g., a head-end node) first sends a path computation request to a known local PCE in its domain to compute a path to a destination (e.g., a tail-end node). The path computation request is then passed from the local PCE to a PCE in every domain on the way to the destination ("downstream" domains).

Once reached by the path computation request, the PCE in the final domain containing the destination computes a VSPT, which is a shortest path tree rooted at the destination and includes the set of shortest path(s) satisfying a set of required constraints from this destination to every border router of the domain. This may be computed using a CSPF (constrained shortest path first) algorithm as known in the art or any other suitable algorithm. The PCE of the final domain then sends the VSPT to the previous domain's PCE with a virtual link (or a "loose hop"). The VSPT optionally uses the loose hop in such a way that hops internal to a domain and their costs remain confidential. A loose hop may have a single associated cost that is a combination or representation of internal costs.

The PCE in the previous domain now repeats execution of the VSPT algorithm, and concatenates the VSPT it received from the final PCE with the topology of its own domain (including any inter-domain links) to compute new paths. This process repeats through all domains until the response reaches the originating PCC. For this reason the VSPT algorithm is referred to as a "recursive backward path computation".

In order for a recursive backward path computation to function properly, an agreement must exist between adjacent domains to share the visibility needed to compute paths. Without an agreement, PCEs may not cooperate to compute paths across multiple domains by exchanging VSPTs, even though a VSPT maintains confidentiality. In these circumstances, adjacent domains may only advertise a single virtual link, which other domains must use in their SPTs. There are multi-domain situations (e.g., domains A-B-C), however, where certain domains may have agreements with certain other domains (A with B, and A with C), but where those other domains do not share an agreement (B not with C). VSPT calculation in these situations may not be possible where agreements do not exist between all adjacent domains.

There remains a need, therefore, for a technique that allows a single head-end node of a first domain to efficiently compute the shortest inter-domain path, without requiring path computation from multiple nodes in multiple other domains. There is also a need for a technique that allows the head-end node to compute the path through other domains having an agreement with the first domain, but where the other domains do not have agreements with each other.

SUMMARY OF THE INVENTION

The present invention is directed to a technique for computing a traffic engineering (TE) label switched path (LSP) that spans multiple domains of a computer network from a head-end node of a local domain to a tail-end node of a remote domain. The novel inter-domain TE-LSP computation technique comprises a computation algorithm executed by the head-end node, which utilizes Path Computation Elements (PCEs) located within the remote domains (i.e., other than the local domain). Specifically, the head-end node requests path segments from a PCE in each of the remote domains, in which the path segments represent paths between all entry border routers to either all exit border routers of the particular remote domain (i.e., through the domain), or to the tail-end node. Upon receiving path segments from each remote domain, the head-end node combines the path segments with local domain information, and performs a forward path computation from the head-end node to the tail-end node to find the best (i.e., "shortest") path.

In accordance with the present invention, while attempting to establish a TE-LSP to the tail-end node, the source head-end node first determines whether the destination tail-end node is in a remote domain. If so, the head-end node identifies the domains located between the source and destination, such as by referencing local configuration or routing policy. The head-end node computes a path, e.g., the best path based on a cost metric, to each exit border router within its local domain that is in communication with one or more entry border routers of the next domain in the direction of the destination (i.e., the "next-hop" or "downstream" domain).

If at least one path exists that meets constraints of the attempted TE-LSP, the head-end node sends a path computation request to a known PCE in the next-hop domain requesting one or more paths from every entry border router in communication with the local, "upstream" domain, to either i) every exit border router in communication with the next downstream domain, or ii) the destination tail-end node if it is located in the same domain. The head-end node receives path segments computed by the PCE, if any, as either physical links or a virtual link with an associated cost, depending on configuration between the domains. If one or more paths exist, the head-end node sends a path computation request to the next downstream domain, and so on, until the destination is reached. Alternatively, the head-end node may first send a path computation request to each PCE in each of the remote domains, and subsequently receive the path segments of all the remote domains, without initially checking, e.g., one at a time, whether a path exists in each domain. Upon receiving all the path segments, the head-end node concatenates those segments with its local path information, and runs a shortest path first (SPF) calculation from the head-end node to the tail-end node based on the topology (physical or virtual) of all the domains.

Advantageously, the technique described herein enables efficient computation of paths, such as inter-domain TE-LSPs and/or diverse paths, across multiple domains of a network. In particular, the inventive technique provides a system for allowing a head-end node of a local domain to perform a forward path computation to a tail-end node of a remote domain based on a more complete topology of path segments received from PCEs within the multiple domains. The invention further provides an optimal (shortest) path from the head-end node to the tail-end node, while preserving confidentiality across the multiple domains.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1A:
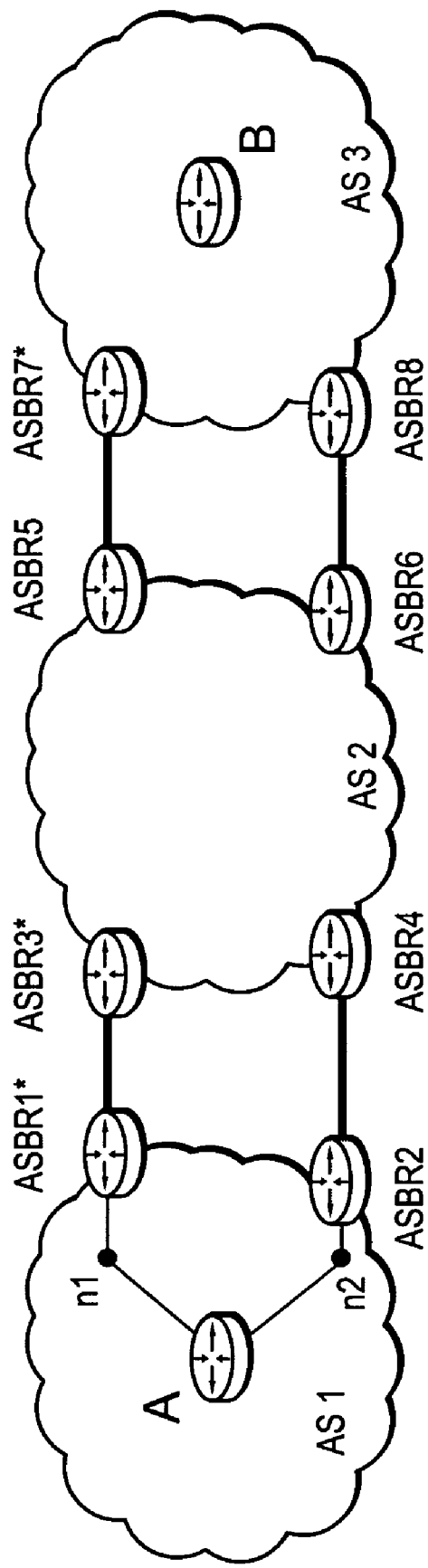
FIG. 1A is a schematic block diagram of an exemplary computer network of autonomous systems that may be used in accordance with the present invention.

FIG. 1A is a schematic block diagram of an exemplary computer network 100a comprising autonomous systems AS1 and AS3 interconnected by autonomous system AS2. An Autonomous System (AS) is herein defined to be a group of intermediate nodes, such as intradomain routers, within a network that are subject to a common authority and execute one or more intradomain routing protocols. Although each AS is illustratively an autonomous system, those skilled in the art will appreciate that the ASes may alternatively be configured as routing domains or other networks or subnetworks. The autonomous system AS1 includes intradomain routers, such as AS border routers ASBR1* and ASBR2, through which communication, such as data packets, may pass into and out of the AS to AS border routers ASBR3* and ASBR4, respectively of AS2. AS2 also includes AS border routers ASBR5 and ASBR6 in communication with border routers ASBR7* and ASBR8 of AS3. Moreover, within AS1 and AS3, there are exemplary intradomain routers A and B, respectively. Also, within AS1 are exemplary intra-domain routers n1 and n2. Those skilled in the art will understand that any number of routers may be used in the ASes, and that the view shown herein is for simplicity.

Data packets may be exchanged among the autonomous systems AS1-AS3 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using pre-determined "interior" gateway protocols (IGPs), such as conventional distance-vector protocols or, illustratively, link-state protocols, through the use of link-state advertisements or link-state packets. In addition, data packets containing network routing information may be exchanged among the autonomous systems AS1-AS3 using "external" gateway protocols, such as the Border Gateway Protocol (BGP).

Figure 1B:
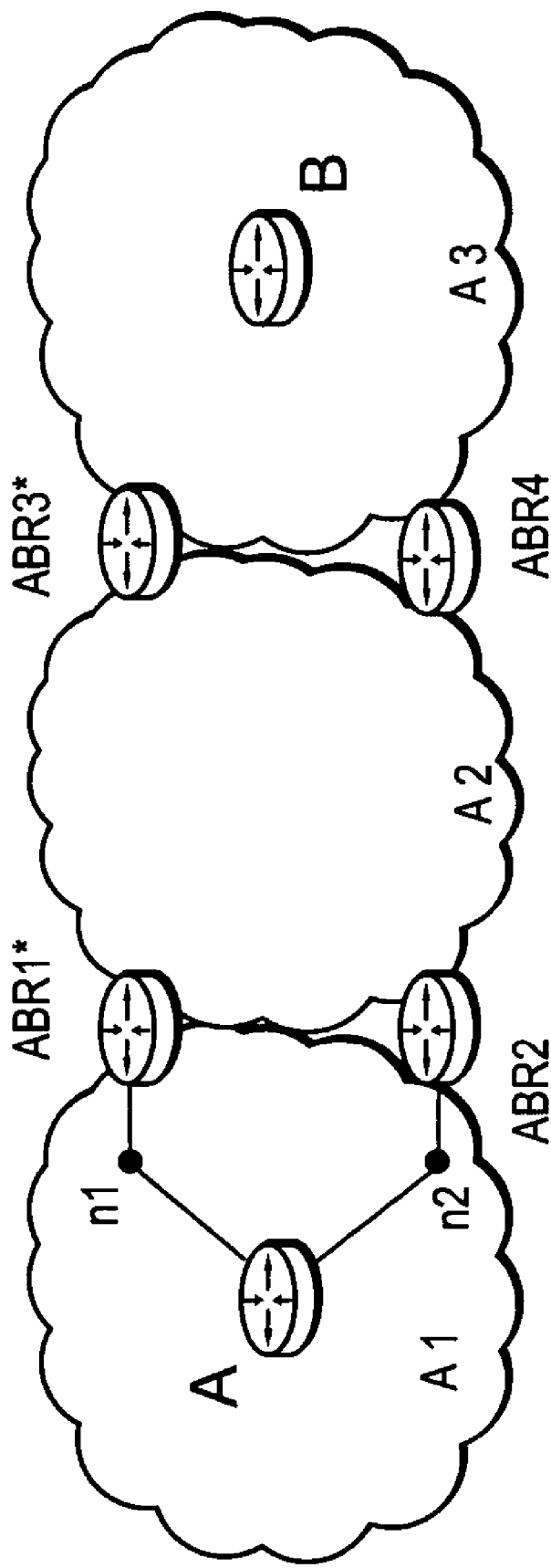
FIG. 1B is a schematic block diagram of an exemplary computer network of areas that may be used in accordance with the present invention.

FIG. 1B is a schematic block diagram of an exemplary computer network 100b comprising areas A1-A3. Area A1 has exemplary intradomain routers A, n1, and n2, while area A3 has exemplary intradomain router B. In addition, A1 and A2 share area border routers ABR1* and ABR2, while A2 and A3 share ABR3* and ABR4. As used herein, an area is a collection of routers that share full network topology information with each other but not necessarily with routers outside the area. A collection of areas may be contained within a single AS. The term area as used herein also encompasses the term "level" which has a similar meaning for networks that employ IS-IS as their IGP, in which case the area border routers ABR1-4 are embodied as level 1/level 2 (L1L2) routers. These examples are merely representative. It will be understood by those skilled in the art that wherever areas or levels are referred to, autonomous systems may be used also. Areas, levels, and autonomous systems are generally referred to herein as "domains". Also, the terms ABR, L1L2 router, ASBR, and more generally, border routers, are used interchangeably herein.

Figure 2:
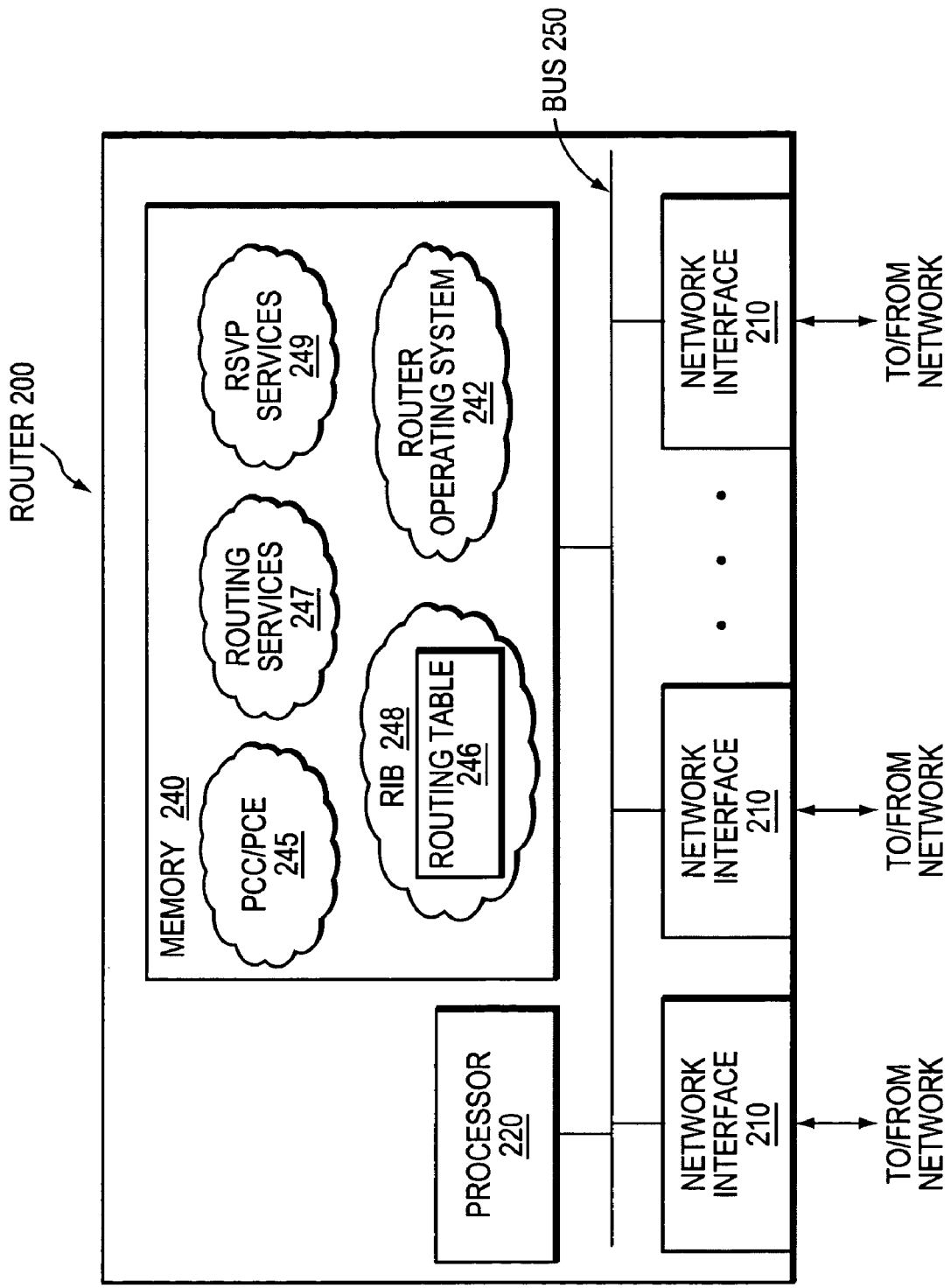
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100a,b. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 246. A router operating system 242, portions of which are typically resident in memory 240 and executed by the processor, functionally organizes the router by, inter alia, invoking network operations in support of software processes and/or services executing on the router. These software processes and/or services include PCC/PCE process 245, routing services 247, Routing Information Base (RIB) 248, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g., OSPF and IS-IS, and BGP. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in R. Braden, et al., *Resource ReSerVation Protocol (RSVP)*, Request For Comments (RFC) 2205, September 1997, available from the IETF and which is hereby incorporated by reference as though fully set forth herein, and in RFC 3209, entitled *RSVP-TE: Extensions to RSVP for LSP Tunnels*, as incorporated above.

Routing table 246 is illustratively resident in memory 240 and used to store routing information, including reachable destination address prefixes and associated attributes. These attributes include next-hop information used by router 200 to reach the destination prefixes and an associated metric (e.g., cost) of reaching the destination prefixes. The routing table 246 is illustratively maintained and managed by RIB 248. To that end, the RIB 248 maintains copies of routes (paths) provided by the routing protocols, such as BGP and IGP, in order to compute best paths/routes for installation into the routing table 246.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol and, in particular, RSVP TE signaling messages.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for computing a TE-LSP that spans multiple domains of a computer network from a head-end node of a local domain to a tail-end node of a remote domain. The novel inter-domain TE-LSP computation technique comprises a computation algorithm executed by the head-end node, which utilizes PCEs located within the remote domains (i.e., other than the local domain). Specifically, the head-end node requests path segments from a PCE in each of the remote domains, in which the path segments represent paths between all entry border routers to either all exit border routers of the particular remote domain (i.e., through the domain), or to the tail-end node. Upon receiving path segments from each remote domain, the head-end node combines the path segments with local domain information, and performs a forward path computation from the head-end node to the tail-end node to find the best (i.e., "shortest") path.

In accordance with the present invention, while attempting to establish a TE-LSP to the tail-end node, the source head-end node first determines whether the destination tail-end node is in a remote domain using, e.g., local configuration or conventional policy (BGP) routing. If the destination is in a remote domain, the head-end node then identifies the domains located between the source and destination, such as by again referencing local configuration or policy routing. The head-end node computes a path, e.g., the best path based on a cost metric, to each exit border router within its local domain that is in communication with one or more entry border routers of the next domain in the direction of the destination (i.e., the "next-hop" or "downstream" domain). Conventional algorithms may be used to compute the paths, such as a CSPF algorithm, or the Dijkstra algorithm (where the head-end node is the minimum cost node).

If at least one path exists that meets constraints of the attempted TE-LSP, the head-end node sends a path computation request to a known PCE in the next-hop domain requesting one or more paths from every entry border router in communication with the local, "upstream" domain, to either i) every exit border router in communication with the next downstream domain, or ii) the destination tail-end node if it is located in the same domain.

As an example, assume border routers marked with '*' in FIGS. 1A and 1B are PCE enabled border routers. The address of the local PCE may be manually configured. Alternatively, the PCE may advertise itself through flooding within the AS. Path computation element discovery (PCED) techniques can be used in accordance with *OSPF MPLS Traffic Engineering Capabilities (draft-vasseur-ospf-te-caps.txt)* by Vasseur, et al., published July 2004, which is hereby incorporated by reference. A PCED message may include indications of PCE capabilities, such as the ability to compute local paths, inter-area paths, inter-AS paths, multi-domain paths, diverse paths, etc. Knowledge of other PCE addresses may be acquired by way of static configuration or BGP advertisements, as could be readily devised by one of skill in the art.

When a PCE receives a path computation request, it computes the set of shortest paths between each entry border router of its domain to every exit border router of the same domain. Notably, the PCE does not request any other PCE to expand the path, and simply returns a response that includes the paths for its domain to the head-end node along with their associated costs. The path computation request (and response) between PCC and PCE can be exchanged in accordance with a protocol specified in Vasseur, et al. *RSVP Path Computation Request and Reply Messages*, Internet Draft, July 2004, which is hereby incorporated by reference as though fully set forth herein. It should be understood that the use of RSVP serves only as an example, and that other communication protocols may be used in accordance with the present invention.

The head-end node receives path segments computed by the PCE, if any, as either physical links or a virtual link with an associated cost, depending on whether the domains in communication are configured to share visibility information. The received paths are stored in memory 240, e.g., in a TE database (not shown) of the head-end node. Notably, links may be virtual or "loose" wherever the network is to be kept confidential. In this case, the complete computed path can be thought of as a basic path through the domains that consists only of the entry and exit points of each confidential domain, and an associated cost metric. Upon receiving a loose hop, an entry border router computes the path to reach the next hop (e.g., the exit border router). Other methods for maintaining confidentiality across domains that preserve a pre-computed path are described in commonly-owned copending U.S. patent application Ser. Nos. 10/982,641, entitled SYSTEM AND METHOD FOR RETRIEVING COMPUTED PATHS FROM A PATH COMPUTATION ELEMENT USING A PATH KEY, and 10/983,327, entitled SYSTEM AND METHOD FOR RETRIEVING COMPUTED PATHS FROM A PATH COMPUTATION ELEMENT USING ENCRYPTED OBJECTS, both filed by Vasseur et al., on Nov. 5, 2004, the contents of which are hereby incorporated by reference in their entirety.

If one or more paths exist, the head-end node sends a path computation request to the next downstream domain, and so on, until the destination is reached. Upon receiving all the path segments, the head-end node concatenates the segments with its local path information, and runs a shortest path first (SPF) calculation from the head-end node to the tail-end node based on the topology (physical or virtual) of all the domains.

Figure 3:
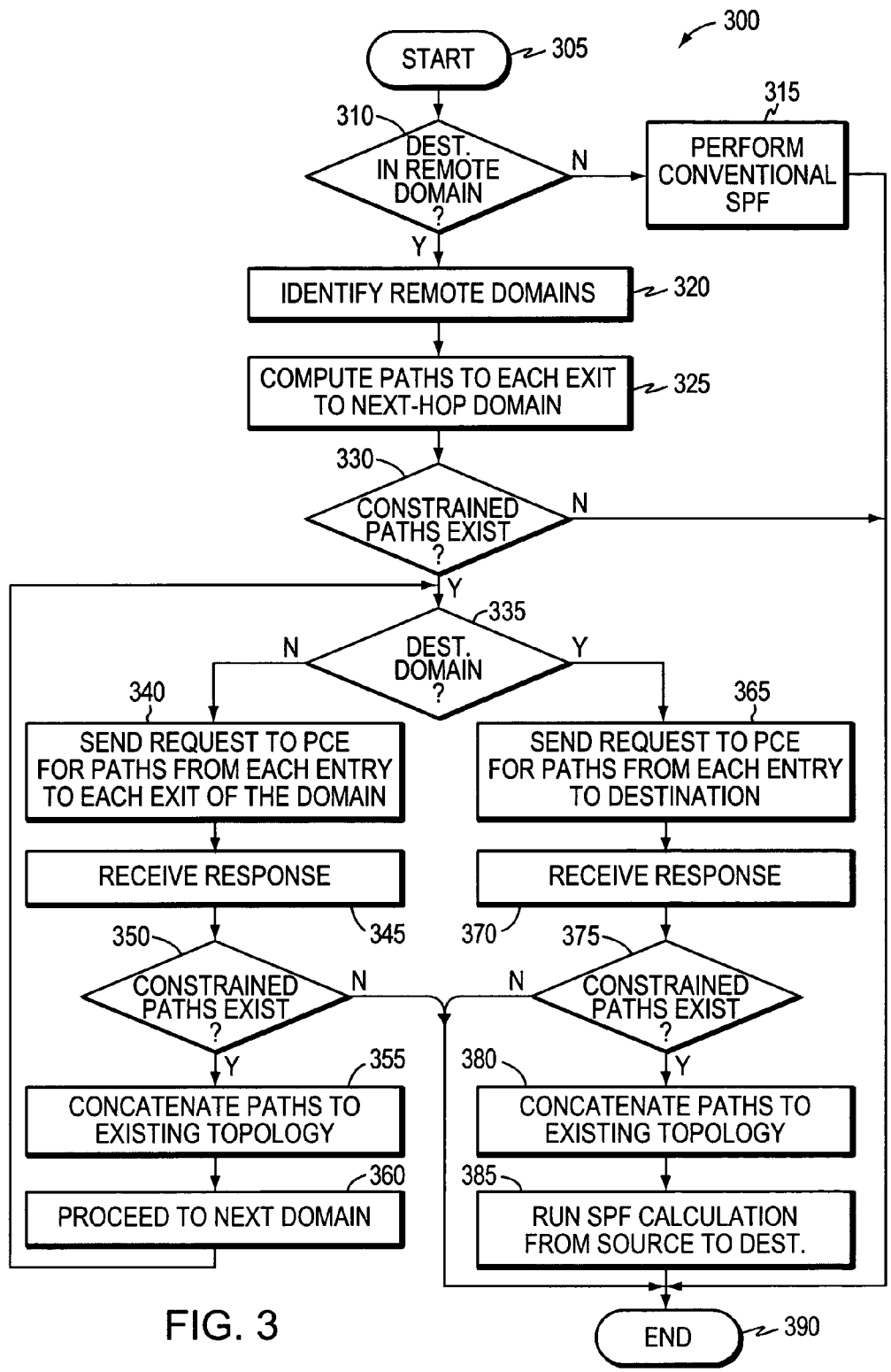
FIG. 3 is a flowchart illustrating a sequence of steps for calculating a TE-LSP in accordance with the present invention.

FIG. 3 is a flowchart illustrating a sequence of steps for calculating a TE-LSP in accordance with the present invention. The sequence 300 starts at step 305, and continues to step 310, where the head-end node determines whether the destination tail-end node resides in a remote domain. If not (i.e., the destination is local) the head-end node performs a conventional SPF in step 315 to the tail-end node and the sequence ends at step 390. Otherwise, in step 320, the head-end node identifies the remote domains disposed between the local domain and the remote domain containing the destination. In step 325, the head-end node calculates the shortest paths to each exit border router of its domain that is connected to the next-hop downstream domain. If in step 330 it is determined that no paths exist, such as when no paths meet the TE-LSP constraints, the sequence ends at step 390.

If at least one path exists at step 330, however, the sequence continues to step 335 where a determination is made to whether the domain in question ("current" domain) is the destination domain. If not, at step 340, the head-end node sends a request to the PCE of the current domain for one or more paths from each entry border router of the current domain to each exit border router of the current domain. At step 345 the head-end node receives a response from the PCE, which may be a set of physical or virtual links, as described above. In path 350, a determination is made as to whether any paths exist in this domain that meet the constraints. If not, the sequence ends. Otherwise, the head-end node concatenates the paths in the response to the existing stored topology in step 355, and proceeds to path calculation with respect to the next domain (step 360). Here, the sequence returns to step 335 where the domain in question is the "next-hop downstream" domain.

If it is determined that the next-hop downstream domain is the destination domain, at step 365 the head-end node sends a request to the PCE of the destination domain for one or more paths from each entry border router of the destination domain to the destination. At step 370 the head-end node receives a response from the PCE. And, in step 375, a determination is made as to whether any constrained paths exist in the domain. If not, the sequence ends at step 390. Otherwise, the head-end node concatenates the paths in the final response to the existing stored topology in step 380. With full network topology (physical and virtual), the head-end node performs an SPF, rooted at the head-end node (source), to the tail-end node (destination) in step 385 to find the shortest path between the source and destination for establishment of the TE-LSP. The sequence then ends in step 390.

It should be noted that, in an alternative embodiment, the head-end node may first send a path computation request to each PCE in each of the remote domains, and subsequently receive the path segments of all the remote domains, without initially checking, e.g., one at a time, whether a path exists in each domain. Upon receiving all the path segments, the head-end node concatenates those segments with its local path information, and determines whether a path exists that meets the requirements of the TE-LSP. If so, the head-end node runs an SPF calculation from the head-end node to the tail-end node based on the topology (physical or virtual) of all the domains.

Figure 4:
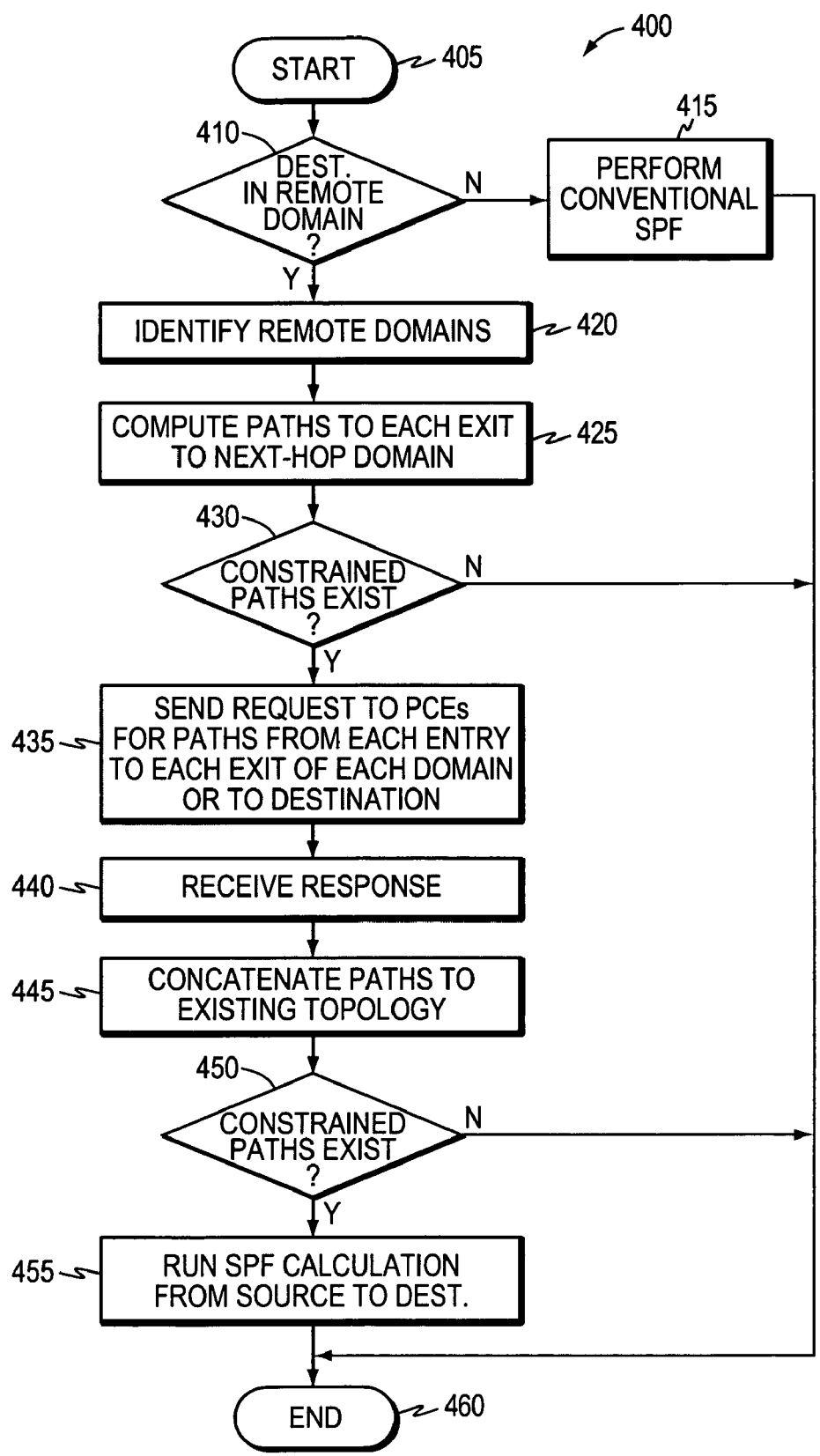
FIG. 4 is a flowchart illustrating an alternative sequence of steps for calculating a TE-LSP in accordance with the present invention.

FIG. 4 is a flowchart illustrating an alternative sequence of steps for calculating a TE-LSP in accordance with the present invention. The sequence 400 starts at step 405, and continues to step 410, where the head-end node determines whether the destination tail-end node resides in a remote domain. If not, i.e. the destination is local, the head-end node performs a conventional SPF in step 415 to the tail-end node and the sequence node at step 460. Otherwise, in step 420, the head-end node identifies the remote domains disposed between the local domain and the remote domain containing the destination. In step 425, the head-end node calculates the shortest path to each exit border router of its domain that is connected to the next-hop downstream domain. If in step 430 it is determined that no paths exist, such as when no paths meet the TE-LSP constraints, the sequence ends at step 460. If at least one path exists at step 430, however, the sequence continues.

At step 435, the head-end node sends a request to a PCE of each remote domain for paths from each entry border router of the PCE's domain to each exit border router of the same domain. At step 440 the head-end node receives a response from each PCE, which may be a set of physical or virtual links, as described above. The head-end node concatenates the paths in the response to the existing stored topology (local topology) in step 445. If in step 450 no path exists through the remote domains that meet the constraints, the sequence ends. Otherwise, with full network topology (physical and virtual), the head-end node performs an SPF, rooted at the head-end node (source), to the tail-end node (destination) in step 455 to find the shortest path between the source and destination for establishment of the TE-LSP. The sequence then ends in step 460.

Figure 5A:
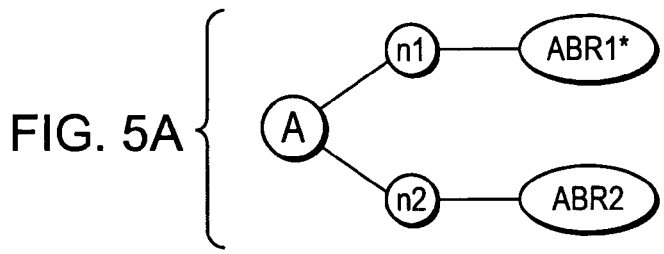
FIGS. 5A-5F are a schematic diagram illustrating an exemplary sequence of path segment accumulation and path computation in accordance with the present invention.
Figure 5B:
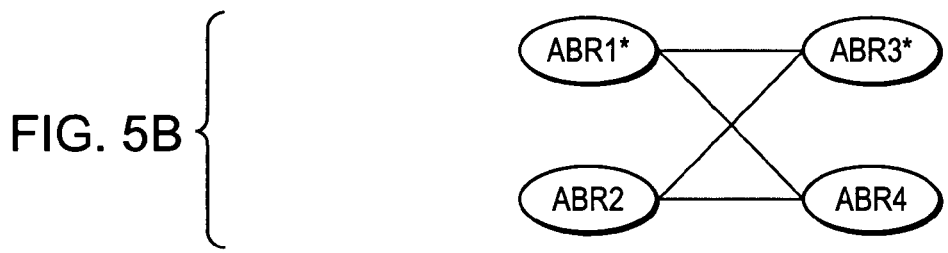
Figure 5C:
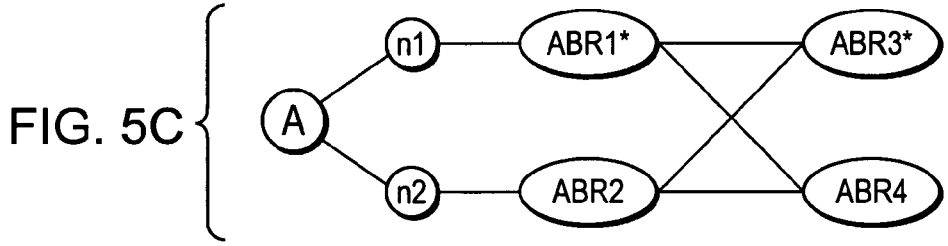
Figure 5D:
Figure 5E:
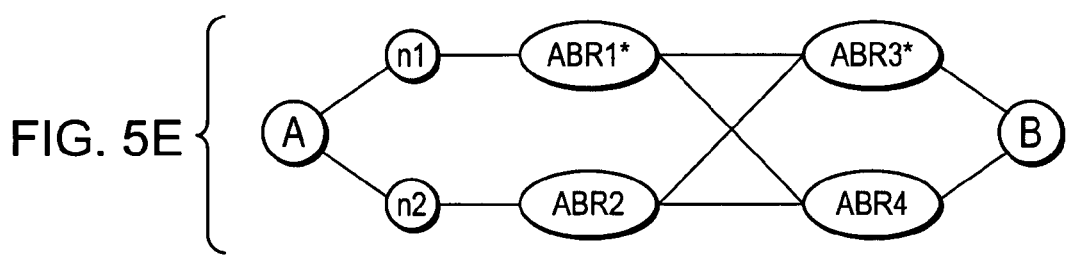
Figure 5F:
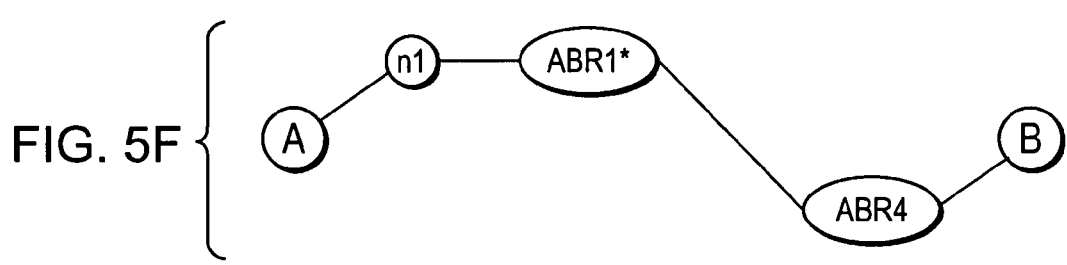

FIGS. 5A-5F are schematic diagrams illustrating an exemplary sequence of path segment accumulation and path computation in accordance with the present invention. Using the network 100b of FIG. 1B, FIG. 5A shows the first path segments of area A1 computed locally from the head-end node A through physical nodes n1 and n2 to exit border routers ABR1* and ABR2, respectively. In accordance with the method described above, head-end node A requests path segments through area A2 from PCE-enabled ABR1*, and receives the paths shown in FIG. 5B. Head-end node concatenates these results with the local information, as shown in FIG. 5C. FIG. 5D shows the returned path segments from the destination area A3 (from PCE-enabled ABR3*) to tail-end node B, which are then concatenated with the existing topology, as seen in FIG. 5E. Illustratively, in FIG. 5E, the links from the head-end node to the first set of border routers (ABR1* and ABR2) are physical links, while the remaining links are virtual. Finally, the head-end node A computes an SPF to the tail-end node B, resulting in the optimal path shown in FIG. 5F. Those skilled in the art will understand that FIGS. 5A-5F are merely to be taken as examples for explanation, and have been simplified for ease of understanding. Notably, cost values have not been shown, and the resultant optimal path is only an example path. Moreover, in the event a remote domain does not have a PCE-enabled router, or does not have an agreement with the domain of the head-end node, those skilled in the art will understand that a combination of the novel technique described herein and other conventional methods (e.g., loose hop routing) may be used.

Advantageously, the technique described herein enables efficient computation of paths, such as inter-domain TE-LSPs and/or diverse paths, across multiple domains of a network. In particular, the inventive technique provides a system for allowing a head-end node of a local domain to perform a forward path computation to a tail-end node of a remote domain based on a more complete topology of path segments received from PCEs within the multiple domains. The invention further provides an optimal (shortest) path from the head-end node to the tail-end node, while preserving confidentiality across the multiple domains.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for computing a traffic engineering (TE) label switched path (LSP) that spans multiple domains of a computer network from a head-end node of a local domain, through one or more intervening remote domains, to a tail-end node of a destination domain, the method comprising:

requesting path segments from a path computation element (PCE) in each of the one or more intervening remote domains and in the destination domain, the path segments representing a first plurality of possible paths within each respective intervening remote domain between every entry border router within that domain that is in communication with an upstream domain and every exit border router within that domain that is in communication with a downstream domain and representing a second plurality of possible paths within the destination domain between every entry border router of the destination domain in communication with an upstream domain and the tail-end node;

receiving, at the head-end node, the path segments from the PCEs;

calculating a local topology that includes a third plurality of possible paths within the local domain;

combining the received path segments that represent the first plurality of possible paths within each respective intervening remote domain between every entry border router within that domain that is in communication with an upstream domain and every exit border router within that domain that is in communication with a downstream domain, with the received path segments that represent the second plurality of possible paths within the destination domain between every entry border router of the destination domain in communication with an upstream domain and the tail-end node, and with the third plurality of possible paths within the local domain, to create an overall topology that includes all possible paths within the local domain, the one or more intervening remote domains, and the destination domain; and performing a path computation, at the head-end node, to find the best path extending from the head-end node to the tail-end node based on the overall topology.

2. The method as in claim 1, wherein the path computation is a forward path computation.

3. The method as in claim 2, wherein the forward path computation implements a constrained shortest path first (CSPF) algorithm.

4. The method as in claim 1, further comprising: determining whether a path exists in one of the multiple domains prior to requesting path segments from another domain.

5. The method as in claim 1, wherein at least some of the received path segments are virtual links where the underlying physical links are not revealed, and wherein the path computation at the head-end node utilizes the at least some of the received path segments that are virtual links.

6. A system for computing a traffic engineering (TE) label switched path (LSP) that spans multiple domains of a computer network, including a local domain, one or more intervening remote domains, and a destination domain, the system comprising:
a node that operates as a path computation element (PCE) in each of the one or more intervening remote domains and the destination domain;
a tail-end node located in the destination domain; and
a head-end node of the local domain, the head-end node configured to i) request path segments from the node that operates as the PCE in each of the one or more intervening remote domains and the destination domain, the path segments representing a first plurality of possible paths within each respective intervening remote domain between every entry border router within that domain that is in communication with an upstream domain and every exit border router within that domain that is in communication with a downstream domain and representing a second plurality of possible paths within the destination domain between every entry border router of the destination domain in communication with an upstream domain and the tail-end node, ii) receive the path segments from the node that operates as the PCE in each of the one or more intervening remote domains, iii) combine the received path segments that represent the first plurality of possible paths within each respective intervening remote domain between every entry border router within that domain that is in communication with an upstream domain and every exit border router within that domain that is in communication with a downstream domain, with the received path segments that represent the second plurality of possible paths within the destination domain between every entry border router of the destination domain in communication with an upstream domain and the tail-end node, and with a third plurality of possible paths within the local domain to create an overall topology that includes all possible paths within the local domain, the one or more intervening remote domains, and the destination domain and iv) perform a path computation to find the best path extending from the head-end node to the tail-end node based on the overall topology.

7. The system as in claim 6, wherein the path computation is a forward path computation.

8. The system as in claim 7, wherein the forward path computation implements a constrained shortest path first (CSPF) algorithm.

9. The system as in claim 6, wherein the head-end node determines whether a path exists in one of the multiple domains prior to requesting path segments from another domain.

10. A non-transitory computer readable medium containing executable program instructions for computing a traffic engineering (TE) label switched path (LSP) that spans multiple domains of a computer network from a head-end node of a local domain, through one or more intervening remote domains, to a tail-end node of a destination domain, the executable program instructions comprising program instructions for:
requesting path segments from a path computation element (PCE) in each of the one or more intervening remote domains and in the destination domain, the path segments representing a first plurality of possible paths within each respective intervening remote domain between every entry border router within that domain that is in communication with an upstream domain and every exit border router within that domain that is in communication with a downstream domain and representing a second plurality of possible paths within the destination domain between every entry border router of the destination domain in communication with an upstream domain and the tail-end node;
receiving, at the head-end node, the path segments from the PCEs;
combining the received path segments that represent the first plurality of possible paths within each respective intervening remote domain between every entry border router within that domain that is in communication with an upstream domain and every exit border router within that domain that is in communication with a downstream domain, with the received path segments that represent the second plurality of possible paths within the destination domain between every entry border router of the destination domain in communication with an upstream domain and the tail-end node, and with a third plurality of possible paths within the local domain to create an overall topology that includes all possible paths within the local domain, the one or more intervening remote domains, and the destination domain; and
performing a path computation at the head-end node to find the best path extending from the head-end node to the tail-end node based on the overall topology.

11. An apparatus comprising:
one or more network interfaces;
a memory configured to store instructions for implementing a path computation client (PCC) process; and
a processor configured to read the instructions stored in the memory and to execute the PCC process to
request path segments from a plurality of path computation elements (PCEs), at least one PCE being of a destination domain where a tail-end node is located, and at least one PCE being of a remote domain other than the destination domain, the path segments representing a first plurality of possible paths within the PCE's domain between every entry border router within the domain that is in communication with an upstream domain and every exit border router within the domain that is in communication with a downstream domain in the case of a remote domain other than the destination domain, and representing a second plurality of possible paths between every entry border router in communication with an upstream domain and the tail-end node in the case of the destination domain, receive, via the one or more network interfaces, the path segments from the PCEs, determine a local topology that includes a third plurality of possible paths within the local domain, combine the received path segments for each remote domain other than the destination domain that represent the first plurality of possible paths between every entry border router that is in communication with an upstream domain and every exit border router that is in communication with a downstream domain, with the received path segments for the destination domain that represent the second plurality of possible paths between every entry border router in communication with an upstream domain and the tail-end node, and with the third plurality of possible paths within the local domain, to create an overall topology that includes all possible paths within the local domain, each remote domain other than the destination domain, and the destination domain, and perform a path computation to find the best path extending from the apparatus to the tail-end node in the destination domain, based on the overall topology.

12. The apparatus of claim 11, wherein the path computation is a forward path computation.

13. The apparatus of claim 12, wherein the forward path computation implements a constrained shortest path first (CSPF) algorithm.

14. The apparatus of claim 11, wherein the processor is further configured to determine whether a path exists in one of the different domains prior to requesting path segments from another domain.

15. The apparatus as in claim 11, wherein at least some of the received path segments are virtual links where the underlying physical links are not revealed, and wherein the path computation utilizes the at least some of the received path segments that are virtual links.

16. A method comprising:

computing, by a head-end node of a local domain, a local topology of the local domain, the local topology including a third plurality of paths between the head-end node and every exit border router of the local domain in communication with a first remote domain;

requesting, by the head-end node, that a first path computation element (PCE) of the first remote domain provide the head-end node with path segments for a first plurality of paths between every entry border router of the first remote domain in communication with the local domain and every exit border router of the first remote domain in communication with a downstream remote domain;

requesting, by the head-end node, that a second PCE of a second remote domain provide the head-end node with path segments for a second plurality of paths between every entry border router of the second remote domain in communication with an upstream domain and a tail-end node of the second remote domain;

receiving the path segments from the first PCE and the second PCE at the head-end node;

combining, by the head-end node, the received path segments from the first PCE for the first plurality of paths between every entry border router of the first remote domain in communication with the local domain and every exit border router of the first remote domain in communication with a downstream remote domain, with the received path segments from the second PCE for the second plurality of paths between every entry border router of the second remote domain in communication with an upstream domain and the tail-end node of the second remote domain, with the third plurality of paths between the head-end node and every exit border router of the local domain in communication with a first remote domain, to create an overall topology that includes all possible paths within the local domain, the first remote domain, and the second remote domain;

performing, by the head-end node, a forward path computation on the overall topology to construct a preferred path for a traffic engineering (TE) label switched path (LSP) from the head-end node to the tail-end node.

17. The method as in claim 16, wherein at least some of the received path segments are virtual links where the underlying physical links are not revealed, and wherein the forward path computation by the head-end node utilizes the at least some of the received path segments that are virtual links.

18. The method as in claim 16, wherein the forward path computation implements a constrained shortest path first (CSPF) algorithm.

19. The method as in claim 16, further comprising determining whether at least one path exists between an entry border router of the first remote domain in communication with the local domain and an exit border router of the first remote domain in communication with the downstream remote domain, prior to requesting path segments from the second PCE for the second remote domain.

* * * * *

UNITED STATES PATENT AND TRADEMARK OFFICE
CERTIFICATE OF CORRECTION

PATENT NO. : 8,320,255 B2
APPLICATION NO. : 11/049587
DATED : November 27, 2012
INVENTOR(S) : Jean-Philippe Vasseur et al.

It is certified that error appears in the above-identified patent and that said Letters Patent is hereby corrected as shown below:

In the Specification:

Col. 3, line 50 should read: "guarantee a set of diversely routed paths because of the entry ~~try~~"

Signed and Sealed this
Fourth Day of June, 2013

Teresa Stanek Rea
*Acting Director of the United States Patent and Trademark Office*